(12) United States Patent
Lee et al.

(10) Patent No.: US 9,152,547 B2
(45) Date of Patent: Oct. 6, 2015

(54) APPARATUS AND METHOD FOR SCRATCH PAD MEMORY MANAGEMENT

(75) Inventors: Jae Don Lee, Paju-si (KR); Shi Hwa Lee, Seoul (KR); Seung Won Lee, Hwaseong-si (KR); Chae Seok Im, Suwon-si (KR); Min Kyu Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1419 days.

(21) Appl. No.: 12/591,946

(22) Filed: Dec. 4, 2009

(65) Prior Publication Data

US 2011/0016285 A1 Jan. 20, 2011

(30) Foreign Application Priority Data

Jul. 16, 2009 (KR) .................... 10-2009-0064850

(51) Int. Cl.
 *G06F 12/02* (2006.01)

(52) U.S. Cl.
 CPC .......... *G06F 12/023* (2013.01); *G06F 12/0292* (2013.01)

(58) Field of Classification Search
 CPC ....... G06F 12/02; G06F 12/023; G06F 3/064; G06F 12/0223–12/0246; G06F 12/0886; G06F 2205/063; G06F 2205/066; G06F 2211/1021; G06F 2212/652
 USPC .................. 711/133, 170–173, 200–210, 221
 See application file for complete search history.

(56) References Cited

U.S. PATENT DOCUMENTS

| | | | | |
|---|---|---|---|---|
| 5,893,159 A * | 4/1999 | Schneider | ...... | 711/150 |
| 5,978,893 A * | 11/1999 | Bakshi et al. | ...... | 711/171 |
| 6,175,900 B1 * | 1/2001 | Forin et al. | ...... | 711/156 |
| 6,219,772 B1 * | 4/2001 | Gadangi et al. | ...... | 711/170 |
| 6,363,468 B1 * | 3/2002 | Allison | ...... | 711/173 |
| 6,453,404 B1 * | 9/2002 | Bereznyi et al. | ...... | 711/171 |
| 6,804,761 B1 * | 10/2004 | Chen et al. | ...... | 711/170 |
| 6,836,833 B1 * | 12/2004 | Kinter et al. | ...... | 711/173 |
| 7,266,132 B1 * | 9/2007 | Liu et al. | ...... | 370/538 |
| 2007/0150654 A1 * | 6/2007 | Shin et al. | ...... | 711/118 |
| 2008/0168112 A1 * | 7/2008 | Lyons et al. | ...... | 707/206 |
| 2009/0172336 A1 * | 7/2009 | Schmidt | ...... | 711/170 |
| 2010/0095081 A1 * | 4/2010 | McDavitt et al. | ...... | 711/171 |

FOREIGN PATENT DOCUMENTS

| | | |
|---|---|---|
| JP | 2008-9635 | 1/2008 |
| JP | 2008-299455 | 12/2008 |
| JP | 2009/43233 | 2/2009 |
| KR | 10-2007-0096429 | 10/2007 |
| KR | 10-2007-0102485 | 10/2007 |
| KR | 10-2007-0102504 | 10/2007 |
| KR | 10-2008-0068468 | 7/2008 |

OTHER PUBLICATIONS

"Classify." Merriam-Webster.com. Merriam-Webster, n.d. Web. <http://www.merriam-webster.com/dictionary/classify>. Retrieved Jul. 8, 2014.*

* cited by examiner

*Primary Examiner* — Aimee Li
*Assistant Examiner* — Nicholas Simonetti
(74) *Attorney, Agent, or Firm* — NSIP Law

(57) ABSTRACT

Disclosed is a scratch pad memory management device and a method thereof. The scratch pad memory management device divides a scratch pad memory into a plurality of unit blocks, maintains a memory allocation table corresponding to indices of the plurality of unit blocks in a main memory, and manages the scratch pad memory.

19 Claims, 8 Drawing Sheets

APPARATUS AND METHOD FOR SCRATCH PAD MEMORY MANAGEMENT

CROSS-REFERENCE TO RELATED APPLICATIONS

This application claims the benefit of Korean Patent Application No. 10-2009-0064850, filed on Jul. 16, 2009 in the Korean Intellectual Property Office, the disclosure of which is incorporated herein by reference.

BACKGROUND

1. Field

The example embodiments relate to a scratch pad memory management device and a method thereof, and particularly to a technology that manages the scratch pad memory by using a memory allocation table maintained in a main memory.

2. Description of the Related Art

A processor has a fast internal memory to store data. A processor for an embedded system may use a scratch pad memory having a simple configuration instead of a cache memory, and may process data transmission between an external main memory and the scratch pad memory by using a direct memory access (DMA). The main memory is an on-off chip memory, and may include a DRAM, an SDRAM, and the like.

However, conventionally, an allocation scheme based on a compiler has been used for utilizing the scratch pad memory. The allocation scheme analyzes an application program when compiling is performed, divides the scratch pad memory by using a result of the analysis, and statically allocates to each task. In this instance, the task may use only an allocated area, and thus, when the task operates, an allocated area of another task may be wasted. Also, the scheme may not be used in an environment where a task is dynamically generated.

Accordingly, there is desire for a dynamic memory management scheme appropriate for the scratch pad memory, and a method thereof.

SUMMARY

Accordingly, it is an aspect of the present invention to provide an improved dynamic memory scheme.

Additional aspects and/or advantages will be set forth in part in the description which follows and, in part, will be apparent from the description, or may be learned by practice of the invention.

The foregoing and/or other aspects are achieved by providing a scratch pad memory management device, the device including a scratch pad memory, divided into a plurality of unit blocks, a main memory, and a memory managing unit being maintained in the main memory to manage the scratch pad memory.

The memory managing unit stores, in a memory allocation table, metadata managing the plurality of unit blocks. Here, indices of the plurality of unit blocks respectively correspond to indices of the metadata stored in the memory allocation table.

Also, the memory managing unit generates a memory chunk including at least one unit block among the plurality of unit blocks of the scratch pad memory, and classifies the memory chuck as one of a free memory, an allocated memory, and a fixed block pool to manage the memory chunk.

Also, the fixed block pool of the scratch pad memory includes a first storing area to store a size of a fixed block, a second storing area to store an index of a previous fixed block pool, a third storing area to store an index of a subsequent fixed block pool, a fourth storing area to indicate an allocation condition and a release condition of each fixed block, and a fifth storing area to store use data.

Also, the memory managing unit further includes a memory allocating unit to manage memory allocation in response to a memory use request, and the memory allocating unit allocates a memory of a fixed block pool when a size of a requested memory is size managed by the fixed block pool, and allocates a free memory of a free list, the size of the free memory being greater than the size of the requested memory and having a smallest difference from the size of the requested memory when the size of the requested memory is not a size managed by the fixed block pool.

Also, when a difference between the size of the free memory of the free list and the size of the request memory is greater than or equal to the unit block, the memory allocating unit separates, from the free memory, a free memory corresponding to the difference and adds the separated free memory to a corresponding free list.

Also, the memory managing unit further includes a memory releasing unit to manage a memory release in response to a memory release request. Here, the memory releasing unit includes a memory incorporating unit, when a memory prior or subsequent to a memory chunk to be released is a free memory, to incorporate the free memory and the memory chunk to be released, a memory allocation table updating unit to update the memory allocation table in response to the memory release, a free list updating unit to update the free list in response to the memory release, a location calculating unit to calculate a fixed block location of the memory chunk to be released, and a bitmap updating unit to update a bitmap that manages the allocation or release of the fixed block.

According to example embodiments, there may be provided a scratch pad memory management method, the method including dividing a scratch pad memory into a plurality of unit blocks, maintaining a memory allocation table in a main memory to manage the scratch pad memory, and managing the scratch pad memory by using the memory allocation table having indices respectively corresponding to the plurality of unit blocks.

In this instance, the managing of the scratch pad memory includes generating a memory chunk including at least one unit block among the plurality of unit blocks of the scratch pad memory, and classifying the memory chunk as one of a free memory, an allocated memory, and a fixed block pool.

Also, the managing of the scratch pad memory records a size of an empty memory in a prior block and a subsequent block of a memory allocation table that manages the free memory, when the memory chunk is classified as the free memory.

Also, the managing of the scratch pad memory records a size of a memory that is allocated, in a prior block and a subsequent block of a memory allocation table that manages the allocated memory, when the memory chunk is classified as the allocated memory.

Also, the managing of the scratch pad memory includes at least one of location information and identification information in the memory allocation table that manages the fixed block pool, the identification information identifying the fixed block pool and the location information recognizing a location in the fixed block pool, when the memory chunk is classified as the fixed block pool.

Also, the managing of the scratch pad memory includes generating a free list where free memories are connected, and storing an index of a previous free memory and an index of a subsequent free memory in the prior block of the free memory.

Also, the managing of the scratch pad memory includes allocating a memory in response to a memory use request, and releasing the memory in response to a memory release request.

Also, when the size of requested memory is not a size managed by the fixed block pool, the allocating of the memory includes allocating a memory of the fixed block pool when a size of the requested memory is a size managed by the fixed block pool, and allocating a free memory of a free list, the size of the free memory being greater than the size of the requested memory and having a smallest difference from the size of the requested memory.

Also, when a difference between the size of the free memory of the free list and the size of the request memory is greater than or equal to the unit block, the allocating of the memory includes separating, from the free memory, a free memory corresponding to the difference, and adding the separated free memory to a corresponding free list.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

Figure 1:
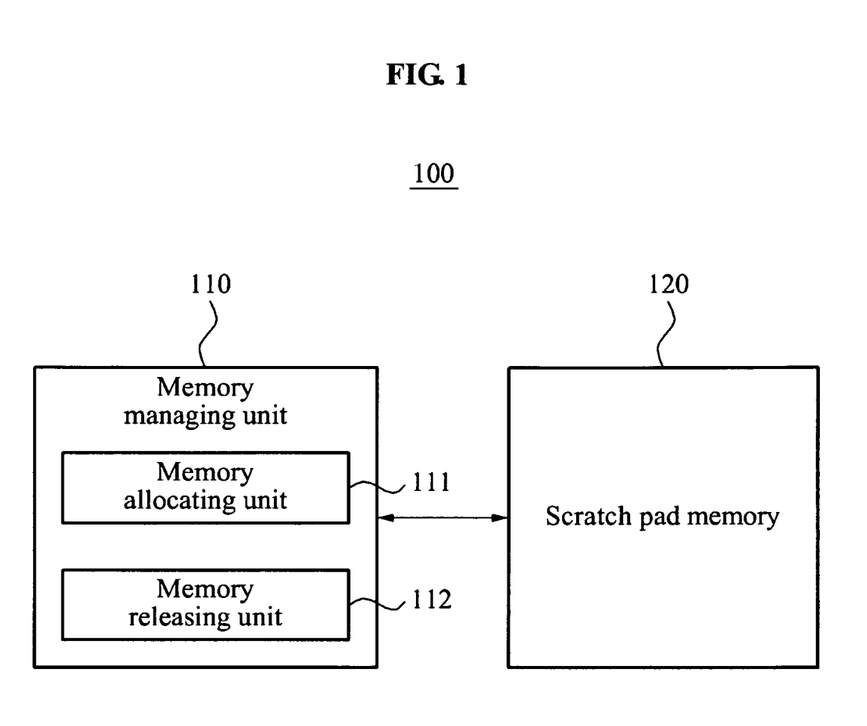
FIG. 1 is a diagram illustrating a scratch pad memory management device according to example embodiments.

FIG. 1 is a diagram illustrating a scratch pad memory management device according to example embodiments.

Referring to FIG. 1, the scratch pad memory management device 100 may include a memory managing unit 110 and a scratch pad memory 120.

The scratch pad memory 120 may be divided into a plurality of unit blocks and be managed. Here, a size of the unit blocks may be arbitrarily set by a user, for example, 32 bytes, and the scratch pad memory may be divided into the plurality of unit blocks. Also, each of the plurality of unit blocks may have a unique index. Here, indices of the plurality of unit blocks of the scratch pad memory may respectively correspond to indices of a memory allocation table. As an example, a unit block 1 of the scratch pad memory may be managed in a block having an index 1 among indices of a plurality of blocks of the memory allocation table. Here, a corresponding relationship between the memory allocation table and the scratch pad memory will be described in detail with reference to FIG. 2.

Figure 2:
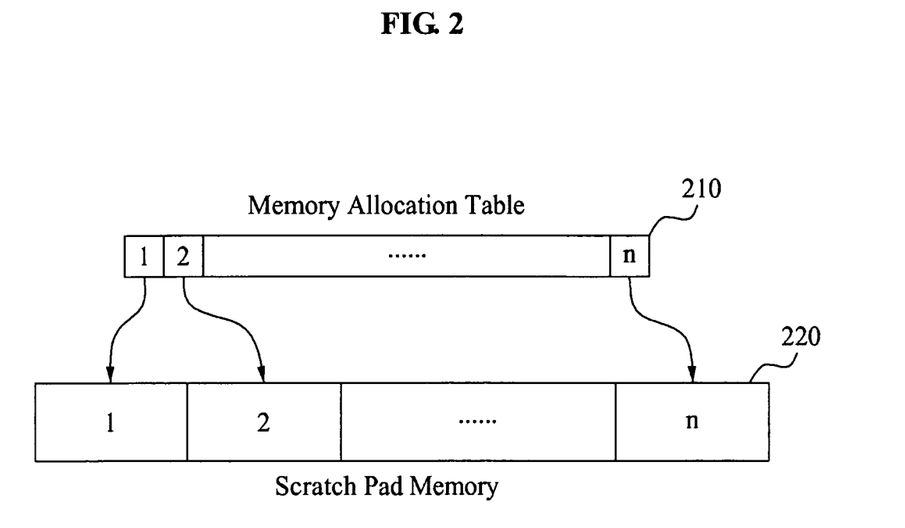
FIG. 2 is a diagram illustrating a scratch pad memory and a memory allocation table according to example embodiments.

FIG. 2 is a diagram illustrating a scratch pad memory and a memory allocation table according to example embodiments.

Referring to FIG. 2, the scratch pad memory 220 is divided into a plurality of unit blocks, and the divided plurality of unit blocks may have unique indices. In this instance, the memory allocation table 210 may include a number of blocks corresponding to a number of the divided plurality of unit blocks, the indices of the divided plurality of unit blocks respectively correspond to indexes of the blocks included in the memory allocation table 210. Accordingly, metadata may be recorded in the memory allocation table and may be read from the memory allocation table by using an index of each unit block.

Referring again to FIG. 1, the memory managing unit 110 may be maintained in the main memory and may manage the scratch pad memory. As an example, the memory managing unit 110 may include a memory allocation table that stores metadata to manage the scratch pad memory. Here, the memory managing unit 110 may generate a memory chunk that includes at least one unit block among the plurality of unit blocks of the scratch pad memory, to efficiently mange the scratch pad memory. Also, the memory chunk may be classified as one of a free memory, an allocated memory, and a fixed block pool. Here, the fixed block pool may include a memory chunk a size of which is non-integer multiples of the unit block. As an example, when the size of the unit block is 32 bytes, a memory of integer multiples of the unit block, such as 32 bytes, 64 bytes, and 96 bytes, may be managed by the free memory, and a memory area of non-integer multiples of the unit block, such as 24 bytes, may be managed by the fixed block pool.

In this instance, the memory managing unit 110 may manage a memory based on different methods depending on a type of a memory chunk of the scratch pad memory. As an example, in the case of a free memory area of the scratch pad memory, a size of an empty memory is recorded in a prior block and a subsequent block of the memory allocation table that manages the free memory area. Also, in the case of an allocated memory area of the scratch pad memory, a size of a memory that is allocated is recorded in a prior block and a subsequent block of a memory allocation table that manages the allocated memory area. Also, in the case of a fixed block pool area of the scratch pad memory, at least one of location information and identification information is stored in the memory allocation table that manages the fixed block pool, the identification information identifying the fixed block pool and the location information recognizing a location in the fixed block pool, when the memory chunk is classified as the fixed block pool. Here, a mark indicating where each fixed block is located in the fixed block pool is recorded in the memory allocation table that manages the fixed block pool. A detailed configuration of the memory allocation table will be described in detail with reference to FIG. 3.

Figure 3:
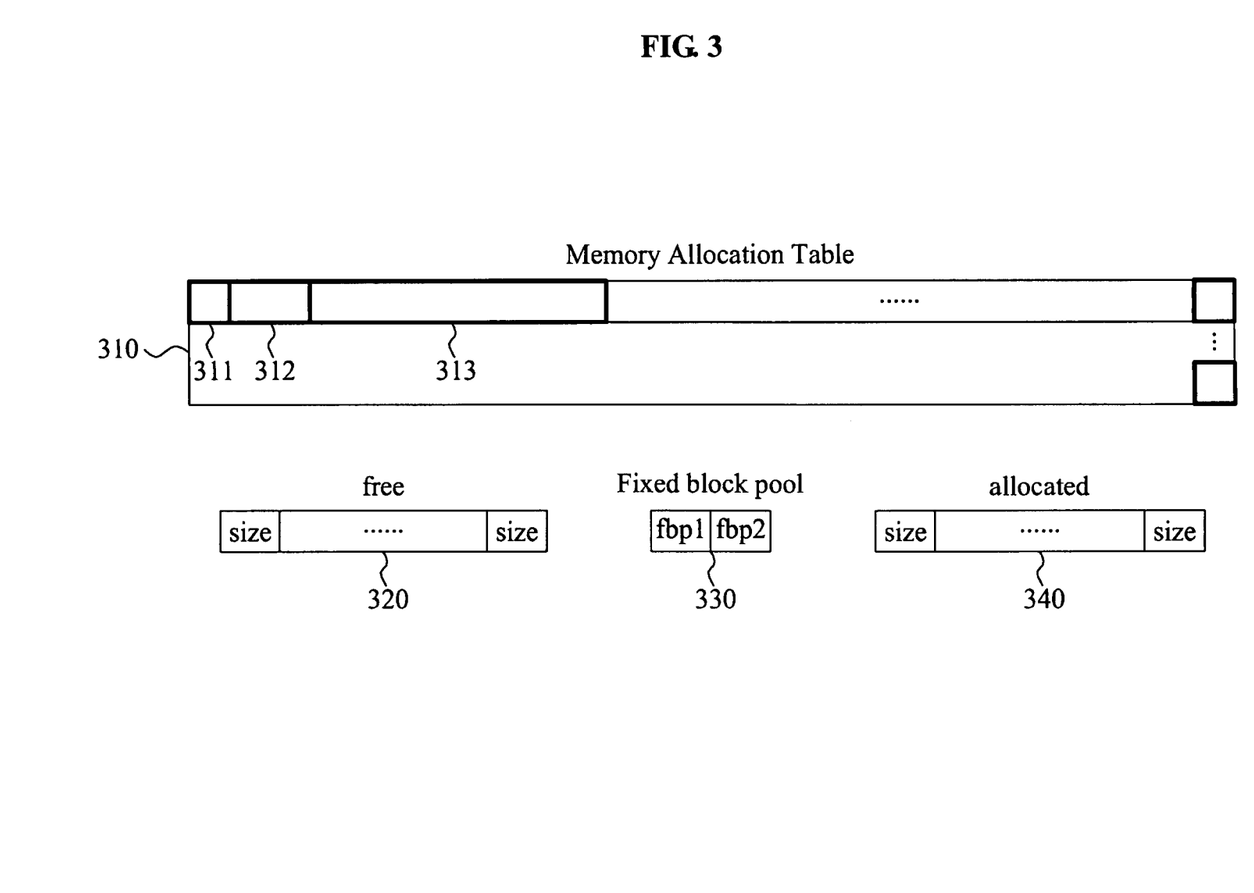
FIG. 3 is a diagram illustrating a detailed configuration of a memory allocation table according to example embodiments.

FIG. 3 is a diagram illustrating a detailed configuration of a memory allocation table according to example embodiments.

Referring to FIG. 3, the memory allocation table 310 may include a plurality of blocks 311, 312, and 313. Each of the plurality of blocks 311, 312, and 313 may manage a scratch pad memory of an identical index, and may store different information based on a type of the scratch pad memory. As an example, a size of a free area is stored in a prior block and a subsequent block of a memory allocation table that manages a free memory in the case of a free memory area 320 of the scratch pad memory, and a size of an allocated area is stored in a prior block and a subsequent block of a memory allocation table that manages an allocated memory in the case of an allocated memory area 340.

Also, the free memory area of the scratch pad memory may be classified based on a memory size and may be managed by a free list. The scratch pad memory area to generate the free list will be described in detail with reference to FIG. 4.

Figure 4:
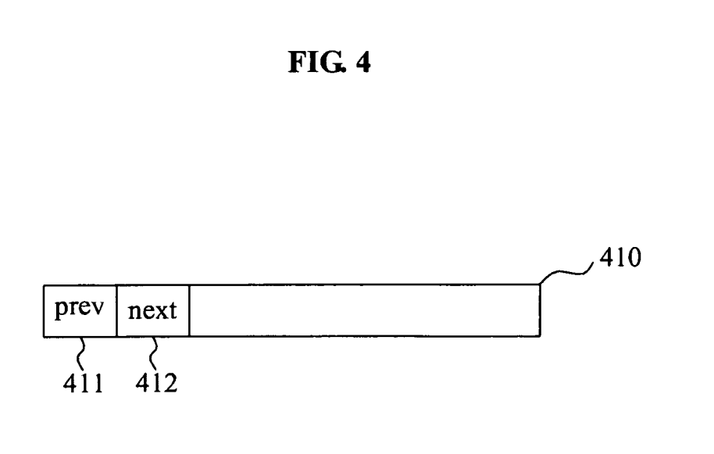
FIG. 4 is a diagram illustrating a detailed configuration of a free memory of a scratch pad memory according to example embodiments.

FIG. 4 is a diagram illustrating a detailed configuration of a free memory of a scratch pad memory according to example embodiments.

Referring to FIG. 4, an index of a previous free memory 411 and an index of a next free memory 412 are stored in a prior block of a free memory block 410 to connect identically sized free memories.

Also, a fixed block pool 330 may be managed based on a size, and it will be described in detail with reference to FIG. 5.

Figure 5:
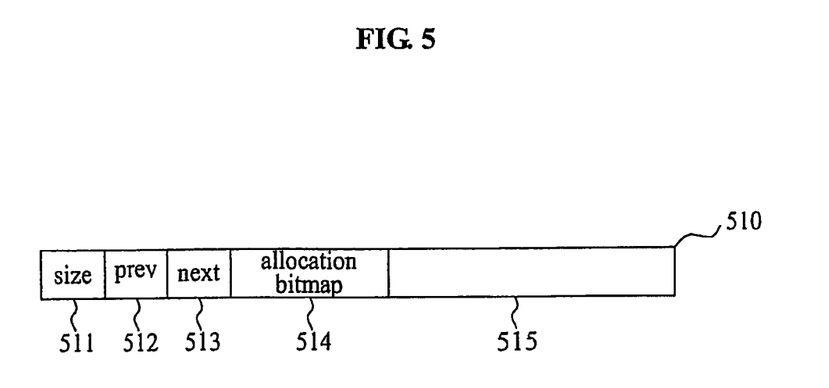
FIG. 5 is a diagram illustrating a detailed configuration of a fixed block pool of a scratch pad memory according to example embodiments.

FIG. 5 is a diagram illustrating a detailed configuration of a fixed block pool of a scratch pad memory according to example embodiments.

Referring to FIG. 5, the fixed block pool 510 may include a first storing area 511 to store a size of a fixed block, a second storing area 512 to store an index of a previous fixed block pool, a third storing area 513 to store an index of a next fixed block pool, a fourth storing area 514 to represent an allocation condition of each fixed block or a release condition of each fixed block, and a fifth storing area 515 to store use data. The allocation condition of each fixed block or the release condition of each block may be managed by an allocation bitmap.

Figure 6:
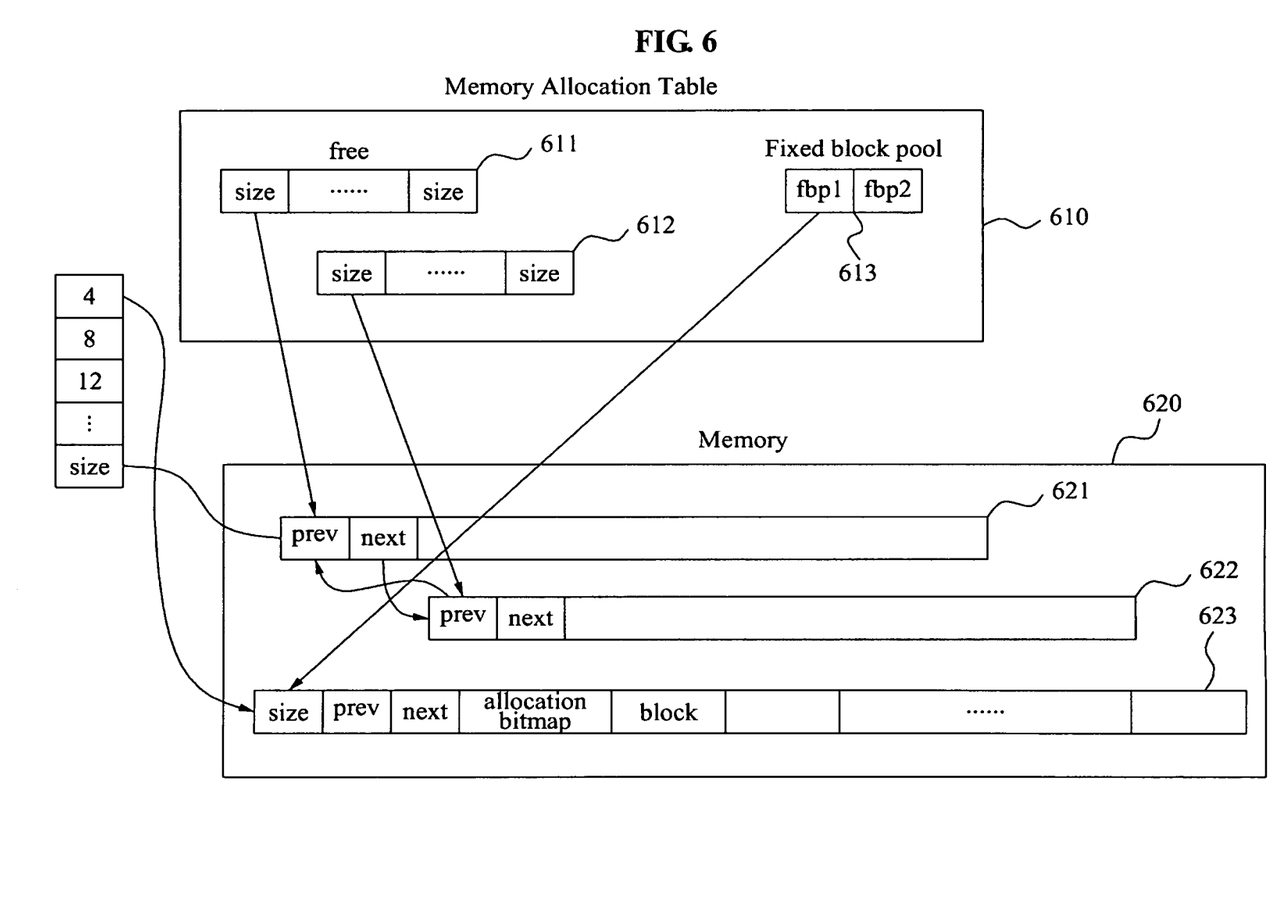
FIG. 6 is a diagram illustrating a detailed configuration of a scratch pad memory and a memory allocation table according to example embodiments.

FIG. 6 is a diagram illustrating a detailed configuration of a scratch pad memory and a memory allocation table according to example embodiments.

Referring to FIG. 6, the scratch pad memory may be configured by one of free memories 621 and 622, an allocated memory (not illustrated), and a fixed block pool 623, and free areas configure a free list according to sizes of the free areas. That is, free areas may be connected through indices for each size of the free areas.

Also, indices of the memory allocation table 610 identical to indices of the scratch pad memory 620 respectively perform managing of a free memory area in a free memory managing area 611, managing of an allocated memory area in a allocated memory managing area 612, and managing of a fixed block pool area in a fixed block pool managing area 613.

However, the memory managing unit 110 may include a memory allocating unit 111 to perform memory allocation and a memory releasing unit 112 to perform memory release.

The memory allocating unit 111 may allocate a memory of the fixed block pool when a size of a requested memory is a size that is managed by the fixed block pool, and allocates a free memory of a free list, the size of the free memory being greater than the size of the requested memory and having a smallest difference from the size of the requested memory when the size of the requested memory is not managed by the fixed block pool. That is, when there is a request for a memory allocation, whether the size of the request memory is a size that is managed by the fixed block pool may be determined, and the requested memory may be preferentially allocated in the fixed block pool. The fixed block pool may manage a memory a size of which is non-integer multiples of a unit block, and thus, when the requested memory is preferentially allocated in the fixed block pool, a waste of a memory may decrease. Also, when the size of the request memory is not a size that is managed by the fixed block pool, a free memory a size of which is closest to a size of the requested memory is allocated, and thus, the memory may be effectively used. In this instance, even though the free memory the size of which is closest to the size of the requested memory is allocated, when a difference in size between a size of a free memory of the free list and the size of the request memory is greater than or equal to a size of the unit block, a free memory corresponding in size to the difference is separated from the free memory, and the separated free memory is added to a corresponding free list, and thus, use of the memory may be effectively managed.

The memory releasing unit 112 may include a memory incorporating unit (not illustrated), when a prior memory or a subsequent memory of a memory chunk to be released is a free memory, to incorporate the free memory and the memory chunk to be released, and may also include a memory allocation table updating unit (not illustrated) to update a memory allocation table in response to a memory release, a free list updating unit (not illustrated) to update a free list in response to the memory release, a location calculating unit (not illustrated) to calculate a fixed block location of the memory chunk to be released, and a bitmap updating unit (not illustrated) to update a bitmap that manages the allocation or release of the fixed block. As an example, the memory releasing unit 112 may determine a size of the memory that is requested to be released. When the memory to be released is a fixed block, an index of the memory to be released is calculated, and an allocation bitmap is updated. When the memory to be released is not the fixed block, incorporation of the memory is performed to obtain a larger memory area when the incorporation is determined to be needed after checking the prior memory and the subsequent memory of the memory to be released.

As described above, when the scratch pad memory is dynamically managed, an efficiency in using the scratch pad memory of an application program may increase, and when metadata for memory management is stored in a main memory, a waste of the scratch pad memory may be decreased.

However, the scratch pad memory management method according to example embodiments may include dividing the scratch pad memory into a plurality of unit blocks, maintaining a memory allocation table in the main memory to manage the scratch pad memory, and managing the scratch pad memory by using the memory allocation table having indices respectively corresponding to the plurality of unit blocks.

That is, the scratch pad memory management method divides the scratch pad memory into the plurality of unit blocks, stores the metadata for the memory management in the main memory, and manages the scratch pad memory by using the memory allocation table having indices respectively corresponding to the plurality of unit blocks of the scratch pad memory.

In this instance, the managing of the scratch pad memory may include generating a memory chunk including at least one unit block among the plurality of unit blocks of the scratch pad memory, and classifying the memory chunk as one of a free memory, an allocated memory, and a fixed block pool.

Figure 7:
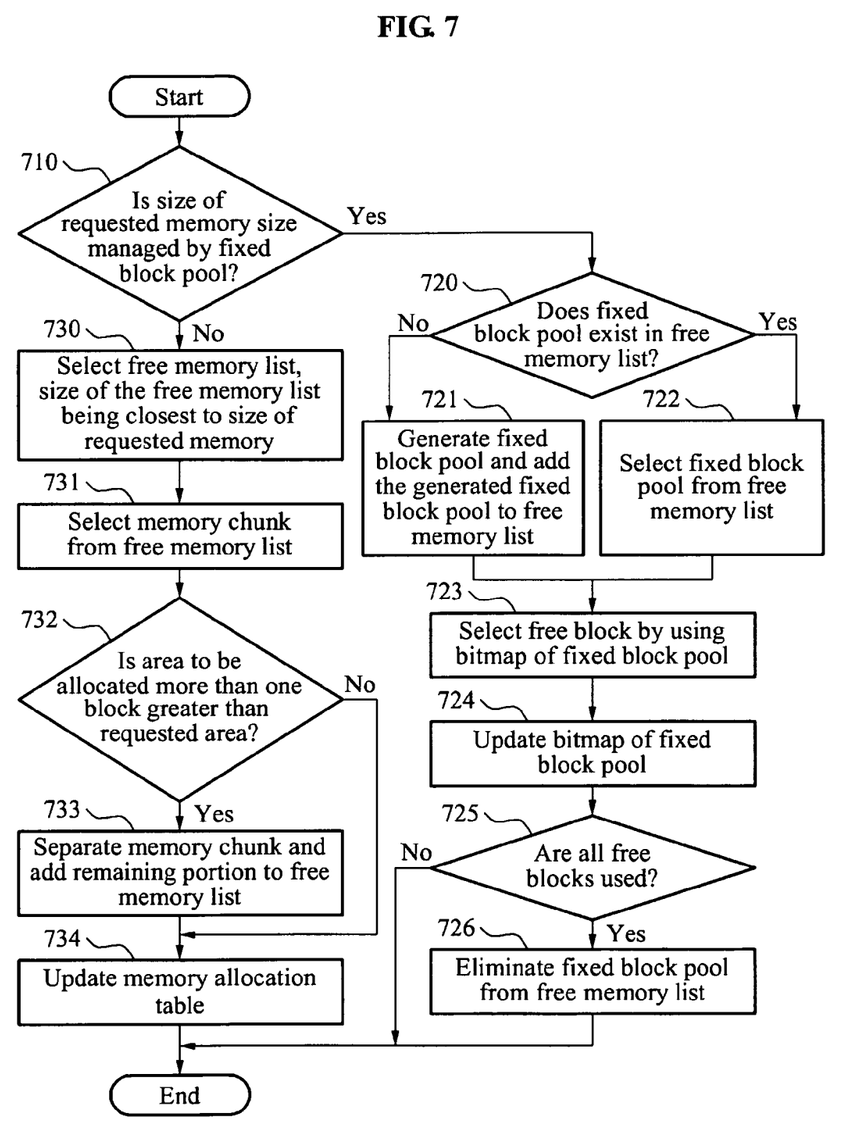
FIG. 7 is a flowchart illustrating a scratch pad memory allocation method according to example embodiments.

FIG. 7 is a flowchart illustrating a scratch pad memory allocation method according to example embodiments.

Referring to FIG. 7, whether a size of a requested memory is a size managed by a fixed block pool is determined in operation 710.

In operation 720, when the size of the requested memory is the size managed by the fixed block pool, whether the fixed block pool exists in a free memory list may be determined. That is, whether the requested size of fixed block pool exists in the free memory list that constitutes a free area of the memory as a list.

In operation 721, when the requested size of fixed block pool does not exist in the free memory list, a fixed block pool is generated and the generated fixed block pool is added to the free memory list.

In operation 722, when the requested size of fixed block pool exists in the free memory list, the existing fixed block pool is selected.

In operation 723, a free block is selected by using an allocation bitmap of the fixed block pool. That is, the allocation bitmap records an allocation or a release of the memory, and thus the free block may be selected by using information of the allocation bitmap.

In operation 724, allocation of the selected free block is recorded by selecting the free block and updating the allocation bitmap.

In operation 725, whether all free blocks are used is determined, and in operation 726, when the all free block are used, the fixed block pool is eliminated from the free memory list.

In operation 730, when the size of the requested memory is not a size that is not managed by the fixed block pool, a free memory list a size of which is closest to a size of the request memory is selected. As an example, a free memory of a free list a size of which is greater than the size of the requested memory and has a smallest difference from the size of the requested memory is allocated, thereby minimizing a size of a memory that is wasted. As an example, when a size of the requested memory is 60 bytes, and a 32 byte free memory list, 64 byte free memory list, and a 96 byte free memory list exist, the 64 byte free memory list may be selected since a size of the 64 byte free memory list is greater than 60 bytes that is a size of the requested memory and has the smallest difference from the size of the request memory.

In operation 731, a memory chunk is selected from the selected free memory list. As described above, a free memory list a size of which is closest to the size of the requested memory is selected and a free memory is allocated from the selected free memory list, thereby minimizing a waste of the memory.

In operation 732, whether an area to be allocated is at least one unit block greater than a requested area is determined.

In operation 733, when the area to be allocated is at least one unit block greater than the size of the requested memory, the memory chunk is separated, and a remaining portion is added to a corresponding free memory list. As an example, a size of a unit block is 32 bytes, the size of the requested memory is 60 bytes, and 96 byte free memory list, 128 byte free memory list, and 160 byte free memory list exist, a free memory list having the smallest difference in size with the requested memory may be the 96 byte free memory list. In this instance, the size of the free memory of the selected free memory list is at least one unit block (36 bytes) greater than the size of the requested memory, and thus, a separate memory (36 bytes) is separated and is added to a corresponding free list.

In operation 734, the memory allocation table is updated based on the memory allocation.

Figure 8:
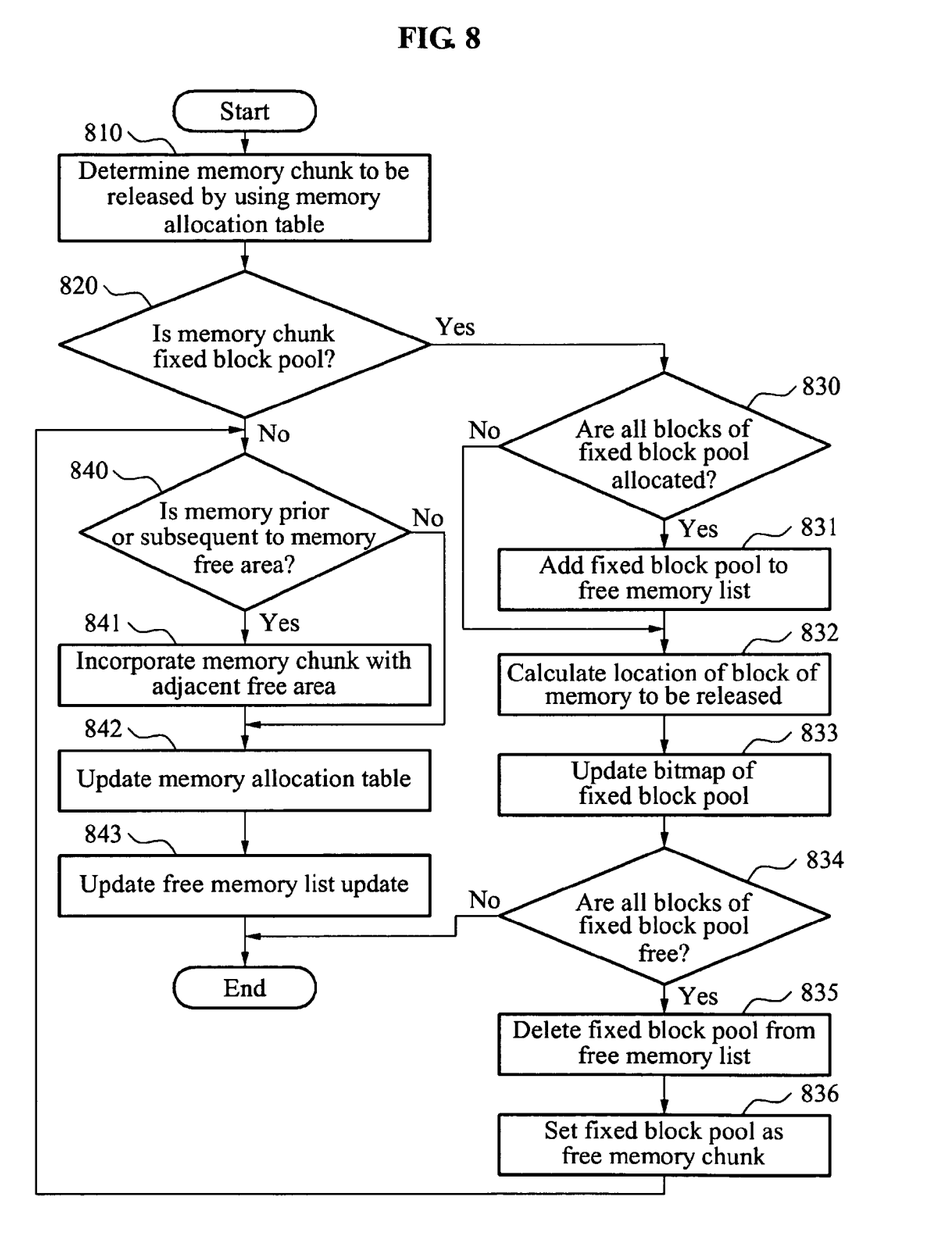
FIG. 8 is a flowchart illustrating a scratch pad memory release method according to example embodiments.

FIG. 8 is a flowchart illustrating a scratch pad memory release method according to example embodiments.

Referring to FIG. 8, a memory chuck to be released is determined by using a memory allocation table when a memory release request is received in operation 810.

In operation 820, whether the memory chunk to be released belongs to a fixed block pool is determined. As an example, a size of the memory is found out by searching the memory allocation table based on an index of the requested memory and whether the size of the memory is a size that is managed by the fixed block pool is determined.

In operation 830, when the memory chunk to be released belongs to the fixed block pool, whether all blocks of the fixed block pool are allocated is determined.

In operation 831, the fixed block pool is added to a free memory list. That is, when a memory of the fixed block pool where all the blocks are allocated is released, there exists a free memory, and thus, the fixed block pool may be added to the free memory list.

In operation 832, a location of a block of the memory to be released is calculated.

In operation 833, an allocation bit map of the memory chunk to be released is updated based on the calculated location of the block.

In operation 834, whether the all blocks of the fixed block pool are released is determined.

In operation 835, when the all blocks of the fixed block pool are released, the fixed block pool is deleted from the free memory list.

In operation 836, the fixed block pool is set as a free memory chunk, and a memory release is performed based on operations 840 through 843.

In operation 840, whether a prior memory or a subsequent memory of the memory to be released is a free area is determined.

In operation 841, when the prior memory or the subsequent memory of the memory to be released is the free area, the memory to be released and the prior memory or the subsequent memory are incorporated.

In operation 842, the memory allocation table is updated according to the memory release.

In operation 843, the changed free memory list is updated.

As described above, when the scratch pad memory is dynamically managed, an efficiency in using the scratch pad memory of an application program may increase, and when metadata for memory management is stored in a main memory, a waste of the scratch pad memory may be decreased.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Although a few example embodiments have been shown and described, it would be appreciated by those skilled in the art that changes may be made in these example embodiments without departing from the principles and spirit of the invention, the scope of which is defined in the claims and their equivalents.

What is claimed is:

1. A scratch pad memory management device, the device comprising:
   a scratch pad memory being divided into a plurality of unit blocks;
   a main memory;
   a memory allocation table; and
   a memory managing unit being maintained in the main memory to manage the scratch pad memory,
   wherein the memory managing unit generates a memory chunk comprising at least one of the plurality of unit blocks of the scratch pad memory, and classifies the memory chunk as one of a free memory, an allocated memory, and a fixed block pool to manage the memory chunk, and
   wherein the memory managing unit stores, in the memory allocation table, metadata to manage the plurality of unit blocks, and
   wherein a size of the fixed block pool is a non-integer multiple of the unit block.

2. The device of claim 1, wherein indices of the plurality of unit blocks respectively correspond to indices of the metadata stored in the memory allocation table.

3. The device of claim 2, wherein the scratch pad memory generates a free list where free memories are connected, the free list being generated for each size of the free memory, and stores, in a prior block of the free memory, an index of a previous free memory and an index of a subsequent free memory.

4. The device of claim 3, wherein: the memory managing unit further comprises a memory allocating unit to manage memory allocation in response to a memory use request, the memory allocating unit allocates a memory of a fixed block pool when a size of a requested memory is a size managed by the fixed block pool, and allocates a free memory of a free list, the size of the free memory being greater than the size of the requested memory and closest to the size of the requested memory when the size of the requested memory is not a size managed by the fixed block pool.

5. The device of claim 4, wherein, when a difference between the size of the free memory of the free list and the size of the requested memory is greater than or equal to the unit block, the memory allocating unit separates, from the free memory, a free memory corresponding to the difference and adds the separated free memory to a corresponding free list.

6. The device of claim 3, wherein the memory managing unit further comprises a memory releasing unit to manage a memory release in response to a memory release request, wherein the memory releasing unit comprises:
   a memory incorporating unit, when a memory prior or subsequent to a memory chunk to be released is a free memory, to incorporate the free memory and the memory chunk to be released; a memory allocation table updating unit to update the memory allocation table in response to the memory release; a free list updating unit to update the free list in response to the memory release; a location calculating unit to calculate a fixed block location of the memory chunk to be released; and a bitmap updating unit to update a bitmap that manages the allocation or release of the fixed block.

7. The device of claim 1, wherein, when the classified memory chunk is classified as the free memory, the memory managing unit records a size of an empty memory in a prior one of the unit blocks and a subsequent block of the memory allocation table that manages the free memory.

8. The device of claim 1, wherein, when the classified memory chunk is classified as the allocated memory, the memory managing unit records a size of a memory that is allocated in a prior one of the unit blocks and a subsequent block of the memory allocation table that manages the allocated memory.

9. The device of claim 1, wherein, when the memory chunk is classified as the fixed block pool, the memory managing unit includes at least one of location information and identification information in the memory allocation table that manages the fixed block pool, the identification information identifying the fixed block pool, and the location information recognizing a location in the fixed block pool.

10. The device of claim 1, wherein the fixed block pool of the scratch pad memory comprises:
    a first storing area to store a size of a fixed block;
    a second storing area to store an index of a previous fixed block pool;
    a third storing area to store an index of a subsequent fixed block pool;
    a fourth storing area to indicate an allocation condition and a release condition of each of the fixed blocks; and
    a fifth storing area to store use data.

11. A scratch pad memory management method, the method comprising:
    dividing a scratch pad memory into a plurality of unit blocks;
    maintaining a memory allocation table in a main memory to manage the scratch pad memory; and
    managing the scratch pad memory comprising using the memory allocation table having indices respectively corresponding to the plurality of unit blocks,
    wherein the managing of the scratch pad memory comprises:
    generating a memory chunk including at least one unit block among the plurality of unit blocks of the scratch pad memory; and
    classifying the memory chunk as one of a free memory, an allocated memory, and a fixed block pool,
    wherein a size of the fixed block pool is a non-integer multiple of the unit block.

12. The method of claim 11, wherein the managing of the scratch pad memory comprises recording a size of an empty memory in a prior block and a subsequent block of a memory allocation table that manages the free memory, when the memory chunk is classified as the free memory.

13. The method of claim 11, wherein the managing of the scratch pad memory comprises recording a size of a memory that is allocated, in a prior block and a subsequent block of a memory allocation table that manages the allocated memory, when the memory chunk is classified as the allocated memory.

14. The method of claim 11, wherein the managing of the scratch pad memory comprises including at least one of location information and identification information in the memory allocation table that manages the fixed block pool, the identification information identifying the fixed block pool and the location information recognizing a location in the fixed block pool, when the memory chunk is classified as the fixed block pool.

15. The method of claim 11, wherein the managing of the scratch pad memory comprises:

generating a free list where free memories are connected; and storing an index of a previous free memory and an index of a subsequent free memory in the prior block of the free memory.

16. The method of claim 15, wherein the managing of the scratch pad memory comprises:

allocating a memory in response to a memory use request; and releasing the memory in response to a memory release request.

17. The method of claim 16, wherein the allocating of the memory comprises allocating a memory of the fixed block pool when a size of the requested memory is a size managed by the fixed block pool, and allocating a free memory of a free list, the size of the free memory being greater than the size of the requested memory and closest to the size of the requested memory when the size of requested memory is not a size managed by the fixed block pool.

18. The method of claim 17, wherein, when a difference between the size of the free memory of the free list and the size of the request memory is greater than or equal to the unit block, the allocating of the memory comprises:

separating, from the free memory, a free memory corresponding to the difference; and adding the separated free memory to a corresponding free list.

19. A non-transitory computer readable recording media storing a program implementing the method of claim 11.

* * * * *